No. 612,843. Patented Oct. 25, 1898.
G. HALM & G. BODINE.
CURRYCOMB.
(Application filed June 7, 1897.)

(No Model.)

Witnesses
C. F. Kilgore
F. D. Merchant

Inventors
Gust Halm
Gust Bodine
By thier Attorney
Jas. F. Williamson

UNITED STATES PATENT OFFICE.

GUST HALM AND GUST BODINE, OF MINNEAPOLIS, MINNESOTA.

CURRYCOMB.

SPECIFICATION forming part of Letters Patent No. 612,843, dated October 25, 1898.

Application filed June 7, 1897. Serial No. 639,676. (No model.)

*To all whom it may concern:*

Be it known that we, GUST HALM and GUST BODINE, citizens of the United States, residing at Minneapolis, in the county of Hennepin and State of Minnesota, have invented certain new and useful Improvements in Self-Cleaning Currycombs; and we do hereby declare the following to be a full, clear, and exact description of the invention, such as will enable others skilled in the art to which it appertains to make and use the same.

Our invention relates to currycombs, and has for its object to provide an improved currycomb with a self-cleaning attachment or attachments whereby the currycomb will be automatically kept clean.

To the ends above noted, our invention consists of the novel devices and combinations of devices hereinafter described, and defined in the claims.

The preferred form of our improved currycomb is illustrated in the accompanying drawings, wherein like letters indicate like parts throughout the several views.

Figure 1:
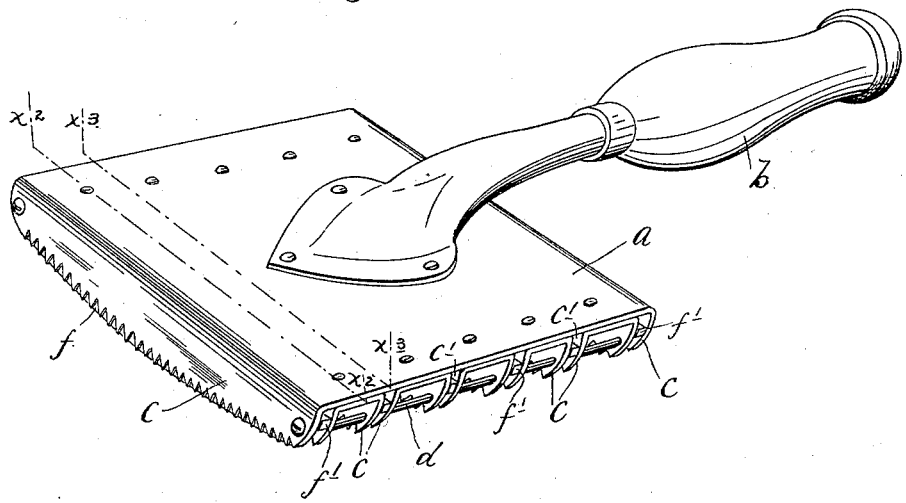
Figure 2:
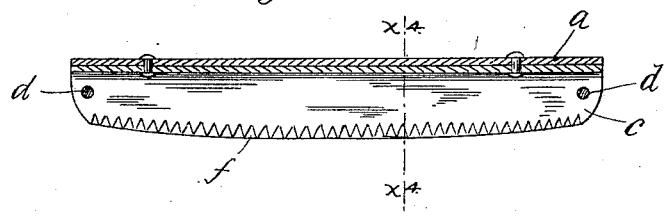
Figure 3:
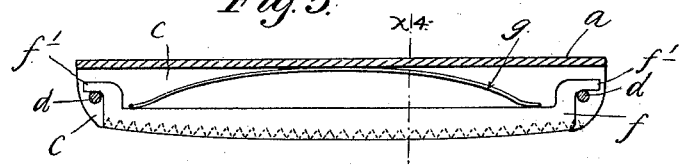
Figure 4:
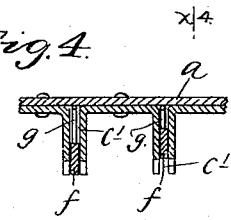

Figure 1 is a perspective view showing the currycomb equipped with our self-cleaning attachments. Fig. 2 is a transverse vertical section taken through the currycomb on the line $X^2 X^2$ of Fig. 1. Fig. 3 is likewise a transverse vertical section through the currycomb, taken on the line $X^3 X^3$ of Fig. 1; and Fig. 4 is a longitudinal vertical section taken through a portion of the currycomb on the lines $X^4 X^4$ of Figs. 2 and 3, some parts being broken away.

$a$ indicates the body-plate or back of the currycomb, which is provided with a handle $b$ and with a series of parallel transversely-disposed comb-blades or serrated flanges $c$, which project from the bottom face thereof. The comb blades or flanges $c$ are arranged in pairs, which are closely spaced so as to form seats $c'$ for the stripper-blades. A pair of parallel retaining-rods $d$ are passed through the ends of the comb blades or flanges $c$ a considerable distance below the back or body section $a$. In each of the seats $c'$ is mounted a stripper blade or bar $f$. These stripper-blades $f$ are subject to the action of springs $g$, which are compressed between their inner edges and the back $a$ of the comb, and at their outer ends they are provided with angular projections or fingers $f'$, which engage the retaining-rods $d$ to limit the outward movement of the said blades $f$. The ends of said blades $f$ work on the inner portions of the retaining-rods $d$ to hold said blades against endwise movement. The lower and outer edges of the said stripper-blades $f$ are constructed on lines which correspond to a line which intersects the points or serrations of the comb blades or flanges $c$. When the retaining-rods $d$ are in working position, as indicated, the stripper-blades $f$ are thereby held with freedom for up-and-down movement, but are held from displacement, and the springs $g$ are held from displacement in the seats $c'$ by the said stripper-blades $f$ and their finger projections $f'$.

It is a well-known fact to all persons familiar with the use of currycombs that with an ordinary currycomb the teeth soon become filled and clogged with the loose hair and dirt, which in the combing action are loosened from the animal, and that this collected hair and dirt can be loosened from the teeth of the comb only by pulling or forcing the same from the teeth by the use of the fingers or some tool held in the hand. This is essentially a very slow and dirty process of cleaning the comb. Furthermore, in an attempt to clean such combs they are frequently pounded and battered out of shape.

When our improved currycomb above described is used, the spring-pressed stripper-blades $f$ will be forced slightly inward or toward the back of the comb, so as to permit the serrations of the comb-blades to project and act in the ordinary manner; but as soon as the pressure is taken off of the said stripper-blades by the removal of the comb from the animal their springs will force the same outward to their extreme limits, thus stripping and cleaning the teeth of the hair and dirt which have been removed thereby. However, the stripper-plates under the combing action keep close contact with the animal's coat of hair and act as scrapers to clean the same of loose dust.

The device just described is completely automatic in its action.

It will also be understood that various alterations in the specific details of construction of the device above described might be made without departing from the spirit of our invention.

What we claim, and desire to secure by Letters Patent of the United States, is as follows:

1. A currycomb, provided with stripper-blades that work against the sides of the comb-blades and are mounted to move outward as far as the points of the blade teeth or edges, and a series of springs acting independently, one on each stripper-blade and yieldingly pressing the same outward, substantially as and for the purposes set forth.

2. The combination with the currycomb, involving the back $a$ and comb-blades $c$ spaced apart to form seats $c'$, of the retaining-rods $d$, the stripper-blades $f$ with lugs $f'$, working in said seats $c'$, and the springs $g$ acting on said stripper-blades $f$ and normally holding the same with their outer edges, in line with the points of the comb-blade teeth, substantially as described.

In testimony whereof we affix our signature in presence of two witnesses.

GUST HALM.
GUST BODINE.

Witnesses:
 BESSIE B. NELSON,
 F. D. MERCHANT.